Patented Sept. 7, 1948

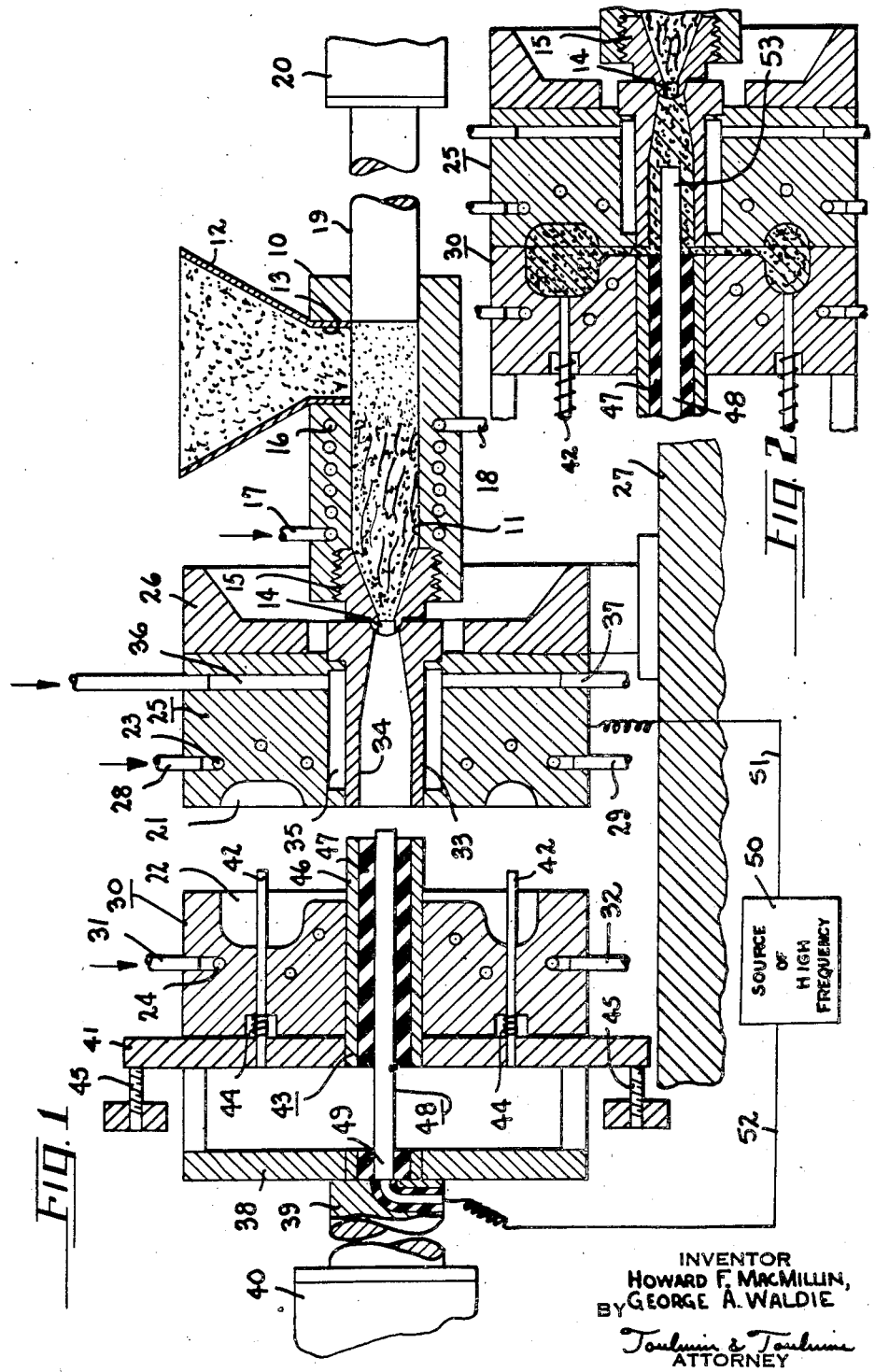

2,448,676

UNITED STATES PATENT OFFICE 2,448,676

METHOD OF INJECTION MOLDING

Howard F. MacMillin and George A. Waldie, Mount Gilead, Ohio, assignors to H-P-M Development Corporation, a corporation of Delaware Application April 23, 1943, Serial No. 484,139

3 Claims. (Cl. 18—55)

This invention relates to a method of injection molding plastic materials and particularly to the method and apparatus for heating the plastic material before it enters the mold.

An object of the invention is to provide a method of heating plastic material for injection molding by means of high frequency current.

Another object of the invention is to provide a method of injection molding plastic materials wherein the plastic material is heated to plasticity within an injection chamber and the material is subsequently heated to a temperature somewhat above plasticity during the injection of the material into a mold by passing the material through a field of high frequency current.

Another object of the invention is to provide a method in accordance with the foregoing object wherein the high frequency field is produced within the sprue chamber of the injection machine so that the plastic material entering the mold will receive its final heating when passing through the sprue chamber.

Another object of the invention is to provide a method of injection molding plastic material wherein the plastic material is heated within the injection chamber of the injection machine by any of the well-known and conventional methods of heating plastic material whereby the temperature of the material is elevated to a temperature that is somewhat below the temperature at which it is to be injected into the mold, and the plastic material is then passed from the injection chamber to a chamber having a high frequency field therein for heating the plastic material while it passes through the high frequency field just before it enters the mold, this final heating occurring during the actual injection of material into the mold.

Another object of the invention is to provide a method of preheating plastic material by conduction to a temperature somewhat below a temperature at which the material will be injected into a mold and to subsequently impart the plastic material with a final heating by passing the same through a high frequency field of electric current for raising the temperature of the material above the preheated temperature before passing the material into the mold.

Another object of the invention is to provide a method of the injection molding of thermosetting resins wherein any of the subject matter of the foregoing objects can be applied to the thermosetting resins.

A still further object of the invention is to provide a method of the injection molding of thermosetting resins wherein the resin is heated by conduction to a condition of plasticity but to a temperature substantially below the temperature at which polymerization is initiated and to subsequently heat the resin while passing the same through a high frequency field for elevating the temperature of the resin to that which initiates polymerization so that the resin will immediately begin polymerization within the mold which is heated to cure the resin.

Another object of the invention is to provide a method of heating thermoplastic and thermosetting resins by the creation of a high frequency electrostatic field within the sprue chamber of an injection machine so that the resin will be raised to the desired temperature for injection into the mold when passing through the sprue chamber.

It is another object of the invention to provide a method of heating thermoplastic or thermosetting resins to a temperature at which they are to be injected into the mold within the sprue chamber of the injection machine wherein an electrode is disposed centrally within the sprue chamber to produce a high frequency field of electric current within the sprue chamber for heating the plastic material passing therethrough.

Further objects and advantages will become apparent from the drawings and the following description.

In the drawings:

Figure 1 is a cross sectional view showing schematically a machine for performing the method of this invention.

Figure 2 is a cross sectional view of a portion of the machine shown in Figure 1 with the molds in closed position during the actual injection of material into the mold cavities.

In this invention relating to injection molding processes of plastic materials, the plastic material is fed into an injection chamber when the injection plunger is in the retracted position and is moved forward into the injection chamber by the plunger wherein the material is heated to a temperature that plasticizes the same but which temperature is lower than that at which the material will be injected into a mold. The preheated or plasticized plastic material is moved into or through a second heating zone or chamber wherein there is provided a high frequency electric current that heats the material to a temperature at which it will be injected into the mold. The heating of the plastic material both in the injection chamber and in the high temperature chamber is accomplished while the injection plunger is reciprocating within the injection chamber in a conventional manner to perform a substantially continuous injection molding process in a more or less conventional cycle of operation which includes closing of the molds, forward advancement of the injection plunger to fill the molds, the dwell period to cure the molded article, reversal of the injection plunger for receiving a new charge of plastic material into the injection chamber and opening of the molds to eject the formed article.

In this invention the heating of the plastic material within the injection chamber, or preheating thereof, can be accomplished by the use of a number of well-known heating means which would include resistance electric heating, circulation of hot fluid around the injection cylinder, magnetic or induction heating. The heating of the plastic material in the high temperature chamber, which in this invention is disclosed as the sprue chamber of the machine, is accomplished by the use of a high frequency electric current.

The high frequency electric current heats the plastic material within the sprue chamber by what is termed high frequency electrostatic heating. This high frequency electrostatic heating is not to be confused with induction heating which is caused primarily by eddy currents produced within a metal member so that the material that is enclosed by the metal member is heated by conduction. In contradistinction to this type of heating, high frequency electrostatic heating is accomplished by producing a field of high frequency current which may be developed by the use of a radio frequency oscillator for producing frequencies of 1,500,000 to 10,000,000 cycles. The effect of high frequency electrostatic heating is produced by placing the electrical non-conducting material that is to be heated between electrodes that have the high frequency current imposed thereon so that a high frequency field is created between the electrodes. One explanation of the heating effect that is produced in the electrical non-conducting material is that the high frequency current produces a deforming of each of the molecules of the marial alternately whereby the internal molecular friction of the material develops heat in the material. Therefore, when the use of high freffuency heating, or high frequency electrostatic heating is referred to in this specification, it is this specific form of heating that is to be considered. One of the particular advantages of the use of high frequency electrostatic heating is the uniformity of the heating effect throughout the entire mass of the material that is being heated which cannot be obtained by the usual methods of conduction heating.

In this invention the apparatus upon which the method of injection is practiced consists of an injection cylinder 10 that is provided with a chamber 11 that receives granular plastic material from a feed hopper 12 through a feed opening 13. The injection cylinder 10 is provided with a restricted discharge opening 14 within the closure member 15 threaded into the end of the injection cylinder 10.

The closure member 15 may be what is conventionally termed as a nozzle having a nozzle orifice through which the plastic material is ejected from the injection chamber 11, but preferably the discharge opening 14 is of sufficient size that it will just prevent flow of heated plastic material therethrough from the injection chamber 11 when there is no pressure existing upon the plastic material in the chamber. In this invention the plastic material in the injection chamber 11 is heated just to plasticity to permit its flow from the injection chamber so that the discharge orifice 14 can be substantially larger than in conventional practice in injection machines because the temperature of the plastic material in the injection chamber will not be quite so high as in conventional practice and therefore the fluidity of the material will be less so that the larger orifice can be used in the closure member 15 and yet the material will not flow from the orifice, all of which will be more fully described hereinafter.

The injection cylinder 10 is provided with a fluid passage 16 having an inlet 17 and an outlet 18 through which a heating fluid is circulated for heating the plastic material within the injection chamber 11. However, while the use of a hot fluid has been disclosed in this invention the heating means for the injection cylinder is not to be confined to this one particular form of heating but rather any method of heating can be used for raising the temperature of the plastic material within the injection chamber 11, including electric resistance heating, induction heating and others.

The injection plunger 19 is slidably fitted within the injection chamber 11 and is reciprocated therein by means of a double-acting hydraulic motor 20 that is supplied with fluid from a suitable fluid source for reciprocating the piston of the motor within the cylinder thereof in conventional manner.

A die member 25 is carried upon a stationary support member 26 that is secured to the bed 27 of the injection machine. The die 25 is provided with one-half of a die cavity 21 that cooperates with a die cavity 22 provided in a movable die member 30 for forming a suitable cavity for producing the article desired. The die members 25 and 30 are provided with fluid circulating passageways 23 and 24, respectively, the passageway 23 having an inlet 28 and an outlet 29, while the passageway 24 has an inlet 31 and an outlet 32. These passageways are provided for circulation of a heating or cooling medium through the dies 25 and 30 in a manner that will be hereinafter described.

The stationary die member 25 carries an insert member 33 that has a chamber 34 therein which forms the sprue chamber for the die that communicates with the discharge opening 14 in the injection cylinder 10. A chamber 35 is provided around the member 33 within the die 25 that has an inlet passage 36 and an outlet passage 37 communicating therewith for the circulation of fluid, and particularly cooling fluid, through the chamber 35 for reasons which will be hereinafter described.

While the member 33 has been shown and described as being inserted in the die member 25, yet it will be understood that this member 33 can just as well be carried in the stationary support 26 and co-operate with the die 25 through a suitable opening to permit flow of plastic material from the sprue chamber 34 into the die cavities 21 and 22 in a manner that will be hereinafter described.

The movable die 30 has a support member 38 that is secured to the plunger 39 of a double-acting hydraulic motor 40 that is connected with a suitable source of fluid under pressure for reciprocating the piston within the cylinder of the motor 40 and thus moving the die 30 toward and away from the stationary die 25.

A knock-out plate 41 carrying knock-out pins 42 is reciprocably supported upon the movable die 30 by means of a plunger 43. Spring members 44 are adapted to draw the knock-out pins 42 into the die 30 when the knock-out plate 41 leaves the stop members 45 upon movement of the die member 30 into closing engagement with the stationary die 25.

The plunger 43 consists of a metal sleeve 46 that has an insulating sleeve 47 therein that receives a central electrode 48 that is secured to the support plate 38 by means of the end 49 of the electrode 48 whereby the electrode 48 is stationary with respect to the die member 30 but the plunger 43 is reciprocable upon the electrode 48 when the die member 30 moves toward and away from the stationary die member 25.

A source of high frequency electric current 50 has one electrical lead 51 therefrom connected to the frame of the injection machine, such as connecting to the die 25, this connection being the ground connection, while the opposite lead 52 from the source of high frequency current is connected to the electrode 48. As previously referred to earlier in this specification the source of high frequency current 50 is adapted to produce extremely high frequency current so that a high frequency field will be established between the electrode 48 and the sprue chamber member 33 when the electrode is extended into the sprue chamber.

As shown in Figure 2, the die 30 has been closed upon the die 25 whereby the plunger 43 has been withdrawn upon the electrode 48 so that the electrode will extend beyond the end of the plunger 43 and will thus protrude into the sprue chamber 34, as shown in Figure 2. When the source of high frequency current is turned on a field of high frequency current will be established between the protruding end 53 of the electrode as shown in Figure 2 and the sprue chamber member 33, so that plastic material passing through the sprue chamber between the electrode 48 and the wall 34 of the sprue chamber will be heated by high frequency electrostatic heating in a manner that has heretofore been referred to. The heating effect upon the plastic material passing between the electrode 48 and the wall of the sprue chamber 34 will be uniform throughout the mass of the material because of the uniformity of effect of the high frequency current through the entire mass of material that is within the high frequency field.

*Operation*

Granular plastic material is introduced into the feed hopper 12 of the injection machine and may be fed into the injection chamber 11 by any suitable mechanism or may flow into the injection chamber 11 by means of gravity as illustrated in Figure 1 when the injection plunger 19 is in the retracted position. At this time the dies 25 and 30 will be in the open position and preferably the source of high frequency current will be cut off.

The hydraulic motor 40 will then be actuated to advance the die 30 into engagement with the die 25, at which time the knock-out plate 41 will be moved in a leftward direction with respect to the die 30 so as to retract the knock-out pins 42 into the cavity 22 and retract the plunger 43 upon the electrode 48 so that the end 53 of the electrode will protrude beyond the end of the plunger 43. When the movable die 30 engages the stationary die 25 the position of the elements will be illustrated as in Figure 2 with the electrode projecting into the sprue chamber 34.

It will be understood that the cycle of operation as being described is such that the machine has been in operation for sometime and the injection chamber 11 has been previously filled with plastic material and plastic material in the injection chamber 11 is being heated continuously by means of a hot fluid circulating through the passageway 16. The heating of the plastic material within the injection chamber 11 is preferably under control of a suitable temperature responsive mechanism that regulates the flow of fluid through the passage 16 to maintain, or hold, a predetermined temperature of the plastic material in the injection chamber 11. The temperature to which the plastic material is raised in the injection chamber 11 is such that it will be above what may be termed the flow point of the plastic material so that it can be ejected from the injection chamber 11 but will be below the maximum temperature to which the material is to be raised for actual injection into the die cavities 21 and 22. Since the temperature of plastic material in the injection chamber 11 is maintained below the maximum temperature of fluidity of the material for injection into the dies it will be readily apparent that the discharge opening 14 in the closure member 15 can be substantially larger than in conventional molding practice because the plasticity of the material will be less at the lower temperature.

If desired, the injection cylinder 10 can be reciprocated relative to the sprue member 33 to break the engagement between the closure member 15 and the sprue chamber to prevent any conduction of heat to the closure member 15 around the discharge opening 14 and thereby preventing any substantial rise in temperature of this area of the member above the temperature that is desired to be maintained in the plastic within the injection chamber 11.

With the die 30 closed upon the die member 25, as shown in Figure 2, the source of high frequency current is turned on to produce a field of high frequency current between the end 53 of the electrode 48 and the sprue chamber member 33. The source of high frequency current can, of course, be under automatic control so that when the die 30 is closed upon the die 25 it will be automatically turned on to establish the high frequency field within the sprue chamber 34.

The hydraulic motor 20 is then actuated to advance the injection plunger 19 through the injection chamber 11 to eject plastic material from the injection chamber 11 through the sprue chamber 34 and into the die cavities 21 and 22. When the heated plastic material, at a flowable temperature passes through the field of high frequency current established within the sprue chamber 34 there is a second heating of the plastic material that raises the temperature thereof substantially to increase the fluidity of the material so that when it is injected into the die cavities it will readily fill all the spaces therein and conform to the intricate configuration of the cavities.

The molds are retained in closed position until the plastic material within the die cavities has set, or cured. The dies will then be opened and the molded article ejected from the die cavity. During the dwell period, when the molds are closed, to set or cure the plastic material the source of high frequency is disconnected from the electrode 48 to stop the heating effect of the plastic material within the sprue chamber 34 and thus permit the same to set within the chamber. This stoppage of heating effect can be accomplished by means of a pressure responsive control that can be actuated by the pressure increase developed on the hydraulic motor 20 at the beginning of the dwell period, the pressure in the hydraulic motor 20 rising rapidly after the die cavities are filled and pressure is developed to force the plastic material into the very small crevices of the cavities.

The chamber 35 around the sprue chamber member 33 is adapted to have cooling fluid circulated therethrough to prevent the member 33 from absorbing heat from the plastic material within the sprue chamber 34 and thus gradually raising the temperature of the member due to the continuation of the injection process. From the previous description it will be understood that the only material that is actually heated is the plastic material between the electrode 48 and the sprue chamber member 33, there being no actual heating of the sprue chamber member 33 due to the previously described phenomena of the high frequency electrostatic heating of the plastic material, the plastic material acting as the dielectric between two electrodes.

The apparatus heretofore described is adapted for injection molding of either thermoplastic or thermosetting resins, and is particularly adapted for use in connection with injection molding of the thermosetting resins. In the operation heretofore described, it will be remembered that the plastic material in the injection chamber 11 was heated to a flowable plastic condition. Considering this condition in connection with thermosetting resins, the thermosetting resin will be preheated in the injection chamber 11 to a temperature at which it will be in a flowable condition for ejection from the injection chamber 11 but will be at a temperature substantially below the temperature at which rapid polymerization occurs so that the thermosetting resin can be heated in the injection chamber 11 and moved through the same for continuous injection molding without producing curing of the material within the injection chamber 11.

As an example, the curing temperature of many thermosetting resins is about 350° but they can be heated to a temperature of around 190° to 200°, at which they will be in a flowable condition, and can be held at this temperature for some 10 to 15 minutes before they will be completely cured. While actual polymerization of the thermosetting resin probably begins around 150°, yet they can be maintained at temperatures about 150° for considerable lengths of time without complete polymerization in accordance with the temperature rise imparted to the material, the higher the temperature rise imparted to the material the shorter the time it can be worked before complete polymerization. Therefore, the thermosetting resin will be heated to a temperature in the injection chamber 11 at which there is no substantial danger of rapid curing of the material in the chamber.

When the thermosetting resin is ejected from the injection chamber 11 and passed through the high frequency field of current set up in the sprue passage 34, the resin will be heated to a temperature at which rapid polymerization will occur but since the material is moving rapidly through the sprue chamber at this time it will be immediately injected into the die cavities so that completion of polymerization will occur in the die cavities, the dies 30 and 25 being held at a temperature sufficiently high to cause rapid curing of the thermosetting resin within the dies.

It will thus be seen that the thermosetting resin can be preheating in the injection chamber 11 to a flowable plastic condition and then will be intensely heated for a very short period of time while passing through the sprue chamber 34 to quickly raise the temperature of thermosetting resin for rapid polymerization just as the material is passing into the die cavities.

As previously described in the operation of the machine it is stated that the source of high frequency current could be disconnected from the electrode 48 just as the pressure begins to rise in the hydraulic motor 20 which indicates that the die cavities are full. Of course, at the first indication of rise in pressure on the hydraulic motor 20 the die cavities are not completely full and under maximum pressure of the hydraulic motor 20 so that during the period of time involved to place the plastic material in the die cavities under maximum pressure from the motor 20 there will be a slight additional feeding of the plastic material from the injection chamber 11 into the sprue passage 34, whereby the last material that enters the sprue passage 34 will be at the temperature of the material ejected from the injection chamber 11 and thus below a rapid polymerization temperature.

The thermosetting resin that polymerizes in the sprue passage 34 is withdrawn from the sprue passage when the die 30 is opened and will be stripped from the electrode 48 when the knockout plate 41 engages the adjustable stop screws 45.

When the machine of this invention is used for injection molding of thermoplastic materials the only change in operation required is that cooling fluid may be circulated through the passages 23 and 24 in the dies 25 and 30, respectively to reduce the dwell period for setting of the thermoplastic material. Under certain conditions it may not even be necessary to circulate cooling fluid through these passages since air cooling of the dies may be sufficiently rapid for setting of the thermoplastic material during a normal cycle of operation of the machine.

While the apparatus disclosed and described herein constitutes a preferred form of the invention, yet it is to be understood that the apparatus is capable of substantial modification without departing from the spirit of the invention, and that all such modifications as fall within the scope of the appended claims are intended to be included herein.

Having thus fully described our invention, what we claim as new and desire to secure by Letters Patent is:

1. A method of injection molding plastic material which includes, heating a plastic material to a flowable condition within a heating chamber, moving the heated plastic material through a sprue chamber and between electrodes that are connected to a source of high frequency current for producing a field in said chamber and thereby intensely heating the plastic material only while passing through the high frequency field between the electrodes to a temperature substantially above that of the plastic material in the heating chamber, cooling the wall of the sprue chamber that is in contact with the plastic material, said cooling being carried out concurrently with the heating of the plastic material in the sprue chamber to avoid absorption of heat by the wall of the sprue chamber, and delivering the plastic material at the elevated temperature from between the electrodes into a mold cavity.

2. A method of injection molding thermosetting resins which includes, heating a thermosetting resin to a flowable condition within a heating chamber to a temperature substantially below that which produces rapid polymerization of the resin, forcing the material through a confined passageway, then moving the heated resin through a sprue chamber and between electrodes that are connected to a source of high frequency current for producing a field in the chamber and thereby intensely heating the resin only while passing through the high frequency field between the electrodes to a temperature substantially above that of the resin in the heating chamber and at which rapid polymerization of the resin will occur, cooling the wall of the sprue chamber that is in contact with the resin just before its entrance into a mold cavity, said cooling being carried out concurrently with the heating of the resin in said sprue chamber to avoid absorption of heat by the wall of the sprue chamber, and delivering the resin at the elevated temperature from between the electrodes into said mold cavity.

3. A method of injection molding resins which includes, heating a resin to a flowable condition within a heating chamber to a temperature substantially below that which produces rapid polymerization of the resin, forcing the material through a confined passageway, then moving the heated resin through a sprue chamber and between electrodes that are connected to a source of high frequency current for producing a field in the chamber and thereby intensely heating the resin only while passing through the high frequency field between the electrodes to a temperature substantially above that of the resin in the heating chamber and at which rapid polymerization of the resin will occur, cooling the wall of the sprue chamber that is in contact with the resin, said cooling being carried out concurrently with the heating of the resin in said sprue chamber to avoid absorption of heat by the wall of the sprue chamber, and delivering the resin at the elevated temperature from between the electrodes into said mold cavity.

HOWARD F. MacMILLIN.
GEORGE A. WALDIE.

REFERENCES CITED

The following references are of record in the file of this patent:

UNITED STATES PATENTS

| Number | Name | Date |
|---|---|---|
| 1,993,942 | Novotney | Mar. 12, 1935 |
| 2,269,388 | Weida | Jan. 6, 1942 |
| 2,296,295 | Shaw | Sept. 22, 1942 |
| 2,296,296 | Shaw | Sept. 22, 1942 |
| 2,356,081 | Novotney | Aug. 15, 1944 |